US012792354B2

(12) United States Patent
Robeck et al.

(10) Patent No.: US 12,792,354 B2
(45) Date of Patent: Nov. 10, 2026

(54) INSTRUCTION PADDING FOR COORDINATING AND ALIGNING PERFORMANCE COUNTERS AND INCREMENTS IN ACCELERATOR PROCESSING UNITS

(71) Applicant: Advanced Micro Devices, Inc., Santa Clara, CA (US)

(72) Inventors: Corbin Andrew Robeck, Odenton, MD (US); Keith Lowery, Garland, TX (US); Rene Willibrordus van Oostrum, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/984,381

(22) Filed: Dec. 17, 2024

(65) Prior Publication Data

US 2026/0169743 A1 Jun. 18, 2026

(51) Int. Cl.

| | |
|---|---|
| ***G06F 9/30*** | (2018.01) |
| ***G06F 8/41*** | (2018.01) |
| ***G06F 11/34*** | (2006.01) |
| ***G06F 11/362*** | (2025.01) |

(52) U.S. Cl.

CPC .......... *G06F 9/30181* (2013.01); *G06F 8/443* (2013.01); *G06F 8/447* (2013.01); *G06F 9/3005* (2013.01); *G06F 11/3404* (2013.01); *G06F 11/3466* (2013.01); *G06F 11/3624* (2013.01); *G06F 11/3632* (2013.01)

(58) Field of Classification Search

CPC ...... G06F 9/30181; G06F 8/443; G06F 8/447; G06F 9/3005; G06F 11/3404; G06F 11/3466; G06F 11/3624; G06F 11/3632

See application file for complete search history.

(56) References Cited

U.S. PATENT DOCUMENTS

| | | | | |
|---|---|---|---|---|
| 8,356,165 B2 * | 1/2013 | Tye | G06F 11/3466 712/226 |
| 8,381,037 B2 * | 2/2013 | DeWitt, Jr. | G06F 11/348 714/39 |
| 9,547,483 B1 * | 1/2017 | Boxall | G06F 8/41 |
| 9,720,708 B2 | 8/2017 | Caspole | |

(Continued)

*Primary Examiner* — Shawn Doman

(74) *Attorney, Agent, or Firm* — Kowert, Hood, Munyon, Rankin & Goetzel, P.C.; Rory D. Rankin

(57) ABSTRACT

An apparatus and method for aligning execution of instructions of a given type with performance counter updates of a parallel data processing circuit. In various implementations, a computing system includes a processing circuit that executes instructions of a compiler that includes an alignment instrumentation tool. When executing the compiler, the processing circuit inserts a tagging instruction that provides identification of the instruction of a given type in source code and in hardware performance counters. In some implementations, the instructions of the given type include one or more of shared memory access instructions and conditional control flow instructions. The first processing circuit also inserts, in program order, a number of padding instructions that causes a number of clock cycles between execution of consecutive instructions of the given type to be equal to or greater than a periodic time interval of updating hardware performance counters.

20 Claims, 9 Drawing Sheets

(56) References Cited

U.S. PATENT DOCUMENTS 10,242,419 B2 3/2019 Sathe
10,754,576 B2 * 8/2020 Yu .......................... G06F 3/0653
2004/0025150 A1 * 2/2004 Heishi .................... G06F 8/4441 717/154
2008/0271021 A1 * 10/2008 Bendapudi .......... G06F 11/3466 718/100
2009/0113403 A1 * 4/2009 Davis ...................... G06F 8/443 717/146
2011/0055483 A1 * 3/2011 Heller, Jr. ............... G06F 9/466 718/103
2011/0214110 A1 * 9/2011 Baron ..................... G06F 8/443 717/153
2011/0276783 A1 * 11/2011 Golla ...................... G06F 9/384 712/200
2012/0054726 A1 * 3/2012 Doing ..................... G06F 8/443 712/E9.028
2012/0233477 A1 * 9/2012 Wu ..................... G06F 11/3466 712/E9.035
2012/0331233 A1 * 12/2012 Cain, III ............. G06F 12/0815 711/135
2013/0290965 A1 * 10/2013 Pohlack .................. G06F 9/467 718/101
2015/0106604 A1 * 4/2015 Greathouse ......... G06F 11/3636 712/244
2016/0320971 A1 * 11/2016 Postavilsky ........... G06F 3/0659
2017/0371761 A1 * 12/2017 Piga .................... G06F 11/3604
2018/0260559 A1 * 9/2018 Jarrous ............... G06F 9/44521
2019/0114276 A1 * 4/2019 Hodes ................. G06F 13/4027
2019/0266013 A1 * 8/2019 Bui ..................... G06F 9/30076
2019/0371041 A1 12/2019 Jin et al.
2023/0116554 A1 * 4/2023 Baeckler ............... G06F 8/4443 717/143
2023/0205517 A1 * 6/2023 Kurzak ................. G06F 8/4434 717/120
2024/0069783 A1 * 2/2024 Roberts ............... G06F 11/3037
2025/0028647 A1 * 1/2025 La Fratta ............ G06F 12/0831

* cited by examiner

INSTRUCTION PADDING FOR COORDINATING AND ALIGNING PERFORMANCE COUNTERS AND INCREMENTS IN ACCELERATOR PROCESSING UNITS

BACKGROUND

Description of the Relevant Art

The parallelization of tasks is used to increase the throughput of computing systems. To this end, compilers extract parallelized tasks from applications to execute in parallel on the system hardware. Parallel data processing circuits execute multiple threads simultaneously in order to take advantage of the identified instruction-level parallelism. For example, the parallel data processing circuit includes multiple parallel lanes of execution used in a single instruction multiple data (SIMD) micro-architecture. These types of micro-architectures provide higher instruction throughput for parallel data applications than a general-purpose micro-architecture used by a host processing circuit. When executing the operating system scheduler, the host processing circuit assigns parallel data tasks to the parallel data processing circuit.

In order to increase the throughput of computing systems, the parallelization of tasks is utilized as much as possible. With advanced manufacturing fabrication techniques and greater integration of hardware, parallel data processing circuits have a greater number of replicated subdivisions of hardware simultaneously executing threads. It becomes more difficult to ensure that operations are executed without interference or disruption while still maintaining high performance. Software developers rely on the feedback provided by hardware performance counters characterizing events that occur during the execution of parallel data applications. However, the collected information from the hardware performance counters is not correlated with the associated issued instructions in the source code.

In view of the above, methods and systems for efficiently aligning execution of instructions of a given type with performance counter updates of a parallel data processing circuit are desired.

Figure 1:
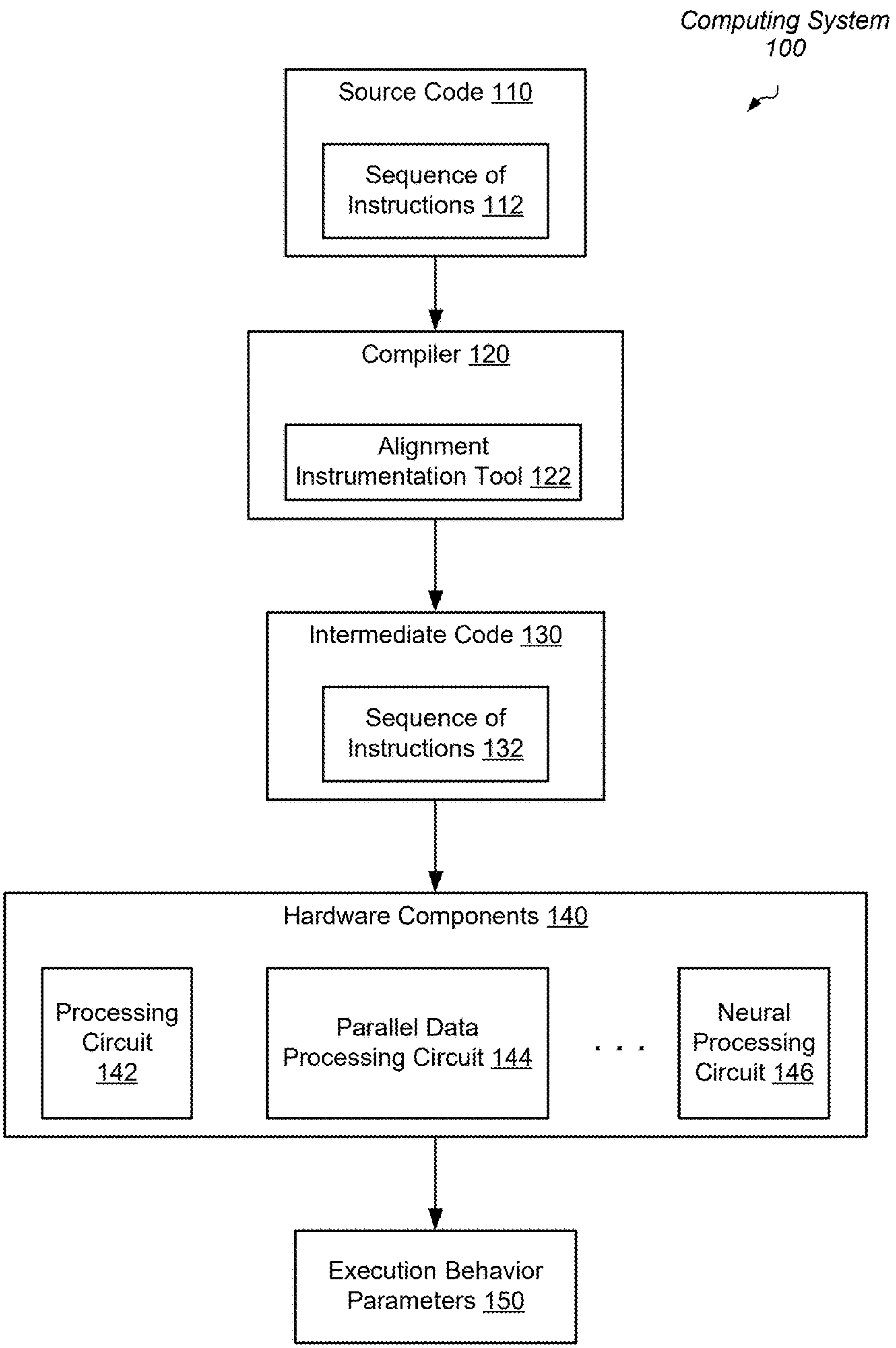
FIG. 1 is a generalized diagram of a computing system that efficiently aligns execution of instructions of a given type with performance counter updates of a parallel data processing circuit.

While the invention is susceptible to various modifications and alternative forms, specific implementations are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Apparatuses and methods efficiently aligning execution of instructions of a given type with performance counter updates of a parallel data processing circuit are contemplated. In various implementations, a computing system includes a first processing circuit and a second processing circuit. In some implementations, the first processing circuit is a host processing circuit with a general-purpose micro-architecture and the second processing circuit is a parallel data processing circuit with a highly parallel data micro-architecture. The parallel data processing circuit includes multiple, replicated compute circuits, each with the circuitry of multiple lanes of execution. The first processing circuit accesses a copy of an application. When the circuitry of the first processing circuit executes instructions of a compiler, the first processing circuit translates the source code of the application to a lower-level representation and then to machine code.

The compiler includes an alignment instrumentation tool. When the circuitry of the first processing circuit executes instructions of the alignment instrumentation tool, the first processing circuit modifies a first sequence of instructions to create a second sequence of instructions by adding at least one or more padding instructions in the first sequence of instructions. The padding instructions include instructions that do not modify program state information such as no-operation (nop) instructions. During execution of the second sequence of instructions by the second processing circuit, the one or more padding instructions cause a duration between consecutive in program order instructions of a given type to increase. The duration is equal to or greater than a periodic time interval for updating hardware performance counters. In some implementations, the instructions of the given type include one or more of shared memory access instructions and conditional control flow instructions.

The hardware performance counters provide feedback that characterizes events that occur during the execution of parallel data applications during the periodic time intervals. When the first processing circuit executes instructions of the alignment instrumentation tool, the first processing circuit also inserts a tagging instruction that provides identification of the location of the instruction of the given type in source code and associates the instruction of the given type with information collected by hardware performance counters during a particular time interval when the instruction of the given type is executed. Therefore, using one or more of the timestamps or identifiers of the periodic time intervals, the information provided by the hardware performance counters is correlated with instructions of the source code that have been executed during the identified periodic time intervals.

In an implementation, during execution of the generated second sequence of instructions by the second processing circuit, information provided by the hardware performance counters include 24 bank conflicts in a dynamic random-access memory (DRAM) used as shared memory during periodic time interval 715. The combination of the identifier of time interval 715 and the tagging information of the single shared memory access instruction executed in time interval 715 correlates the 24 bank conflicts with the single shared memory access instruction executed in time interval 715. The source of inefficiencies of the parallel data applications is now known to developers and users. Developers can tune debugging efforts to the individual instructions that cause inefficiencies during execution. When the source code is modified by the developers to remove the inefficiencies, this modified version of the source code can be executed by the second processing circuit without modification by the alignment instrumentation tool.

Typically, a processing circuit executes parallel data applications without modification by the alignment instrumentation tool. In such cases, the collected information from the hardware performance counters does not correlate with specific, individual instructions in the source code. Therefore, the source of any inefficiencies of the parallel data applications remains unknown to developers and users. In an implementation, during execution of the first sequence of instructions by the second processing circuit, information provided by the hardware performance counters include 37 bank conflicts in a dynamic random-access memory (DRAM) used as shared memory during periodic time interval 715. It is possible that the second processing circuit executed four shared memory access instructions during time interval 715. Even if the four shared memory access instructions of the source code are identified, it is unknown how many bank conflicts were caused by each of the four shared memory access instructions to cause the 37 bank conflicts during time interval 715. Therefore, the source of inefficiencies of the parallel data applications remains unknown to developers and users.

When executing instructions of the alignment instrumentation tool of the compiler, the first processing circuit inserts a number of the padding instructions that cause a single instruction of the given type to be executed in any periodic time interval used for updates of the hardware performance counters. In an implementation, first processing circuit inserts, in program order, a number of padding instructions that causes the number of clock cycles between execution of consecutive in program order instructions of the given type to be equal to or greater than the number of clock cycles of the periodic time interval of updating hardware performance counters. In addition to no-operation (nop) instructions, examples of the padding instructions are a move instruction that includes a destination operand that matches a source operand, and a Boolean arithmetic instruction that generates a destination result that matches a value of a source operand. Other examples of padding instructions to insert that do not change program execution state information are possible and contemplated.

Additionally, the first processing circuit inserts a tagging instruction that provides identification of the instruction of the given type in source code and associates the instruction of the given type with information collected by hardware performance counters during a particular time interval when the instruction of the given type is executed. Examples of the tagging information include one or more of a process identifier (ID), a name of the application or an ID of the application, a version of the application, a compute/graphics type of work, a compute circuit identifier, a SIMD circuit identifier, a wavegroup identifier, a wavefront (wave) identifier, an integer flag or line number or other indicator of the instruction of the given type being measured, a program counter of the instruction of the given type, a hash value based on at least a portion of the program counter of the instruction of the given type, and so on.

Execution of the tagging instruction by the second processing circuit causes the tagging information to be stored in a particular data storage location such as a buffer entry of a buffer or other data structure implemented in a local memory of the second processing circuit. When the instruction of the given type is executed, the second processing circuit also stores one or more of a timestamp and an identifier of a currently used periodic time interval in the buffer entry. The currently used periodic time interval is associated with the updates of hardware performance counters. The second processing circuit also stores one or more of the timestamp and the identifier of the currently used periodic time interval in another buffer used for storage of updates of the hardware performance counters. Therefore, using one or more of the timestamps and identifiers of the periodic time intervals, the information provided by the hardware performance counters is correlated with instructions of the source code that have been executed during the identified periodic time intervals. Further details of these techniques to efficiently align performance counter updates of parallel data processing circuits are provided in the following description of FIGS. 1-9.

Turning now to FIG. 1, a generalized diagram is shown of an implementation of a computing system 100 that efficiently aligns execution of instructions of a given type with performance counter updates of a parallel data processing circuit. As shown, computing system 100 includes source code 110 of an application, compiler 120 used to generate intermediate code 130, and hardware components 140 used to generate the execution behavior parameters 150. In various implementations, an application is a parallel data application that includes source code 110, which is a computer program written by a developer in one of a variety of high-level programming languages such as such as C, C++, and Java and so on. Source code 110 includes sequence of instructions 112 (or sequence 112) that can be a function call (kernel), a subset of a kernel, or code with two or more kernels. Source code 110 in the chosen higher-level language is partially processed with the aid of libraries with their own application program interfaces (APIs).

Source code 110 begins being processed on a general-purpose processing unit such as a central processing unit (CPU) or other type of host processing circuit. A library uses the user mode driver (UMD) to translate function calls in the source code 110 to commands particular to a piece of hardware such as one of the hardware components 140. Hardware components 140 includes a variety of types of hardware. In some implementations, hardware components 140 includes at least processing circuit 142, parallel data processing circuit 144 and neural processing circuit 146. Other types of hardware components are not shown but can be included in hardware components 140 include memory controllers, a variety of types of peripheral devices, and so forth.

In some implementations, processing circuit 142 is a general-purpose processing circuit, such as a central processing unit (CPU), and includes multiple general-purpose processor cores, each with one or more general-purpose pipelines that execute instructions of a particular instruction set architecture (ISA). Parallel data processing circuit 144 is a processing circuit with a highly parallel data microarchitecture. Examples of parallel data processing circuit 144 are a graphics processing unit (GPU), a digital signal processing circuit (DSP), a field programmable gate arrays (FPGA), and an application specific integrated circuit (ASIC). Neural processing circuit 146 is a neural processing unit (NPU) or a neural processing circuit. Neural processing circuit 146 can also be an inference processing unit (EIPU).

The performance of source code 110 can be improved when developers understand the hardware behavior of the corresponding one of the hardware components 140 executing source code 110. Inefficiencies in source code 110 can include bank conflicts in a variety of type of dynamic random-access memories (DRAMs) used as shared memory, cache misses, cache evictions, conditional control flow instructions that cause divergence within parallel lanes of execution of parallel data processing circuit 144 or neural processing circuit 146, and so forth. Performance hardware counters in the parallel data processing circuit 144 or neural processing circuit 146 provide the execution behavior parameters 150, which provides profile information corresponding to source code executing on one or more of parallel data processing circuit 144 or neural processing circuit 146.

Typically, the hardware performance counters update execution behavior parameters 150 at a regular time interval. Source code 110 can have time varying hardware behavior. Within two or more regular (periodic) time intervals, the execution of source code 110 by processing circuitry of hardware components 140 can have a difference in a number of memory accesses performed, a difference in the target data storage locations being accessed, a difference in a number of instructions executed or completed or retired to indicate instruction throughput, a difference in a number of divergent control flow instructions, such as branch instructions, being executed, a difference in the number of bank conflicts of DRAM used as shared memory, a number of cache accesses and misses at one or more levels of a cache memory subsystem, and so forth. Execution behavior parameters 150 include a variety of types of hardware events that occur during execution such as cache misses, cache evictions, a rate of instructions retired or issued, a rate of memory access instructions to particular data storage locations, and other types of hardware trace information. However, with parallel data microarchitectures, many times the collected information from the execution behavior parameters 150 provided by the hardware performance counters is not correlated with the associated issued instructions in the source code.

When the circuitry of processing circuit 142 executes instructions of the alignment instrumentation tool 122 of compiler 120, processing circuit 142 modifies sequence 112 create sequence of instructions 132 of intermediate code 130 by adding (inserting) one or more padding instructions in sequence 112. The insertion of the one or more padding instructions causes a duration between execution of consecutive in program order instructions of a given type to increase. In an implementation, the one or more padding instructions cause the duration to be equal to or greater than a periodic time interval for updating hardware performance counters. In other words, the insertion of the one or more padding instructions cause later execution of instructions of the given type to occur within separate time intervals of hardware performance counter updates of the parallel data processing circuit 144 and/or the neural processing circuit 146.

When executing instructions of the alignment instrumentation tool 122, processing circuit 142 inserts a tagging instruction in sequence 112 that provides identification of the instruction of the given type in source code 110 and in hardware performance counters. In some implementations, the instructions of the given type include one or more of shared memory access instructions and conditional control flow instructions. Examples of the tagging information include one or more of a process identifier (ID), a name of the application or an ID of the application, a version of the application, a compute/graphics type of work, a compute circuit identifier, a SIMD circuit identifier, a wavegroup identifier, a wavefront (wave) identifier, an integer flag or line number or other indicator of the instruction of the given type being measured, a program counter of the instruction of the given type, a hash value based on at least a portion of the program counter of the instruction of the given type, and so on.

When executing instructions of the alignment instrumentation tool 122, processing circuit 142 also inserts, in program order, a number of padding instructions that causes a number of clock cycles between execution of consecutive instructions of the given type to be equal to or greater than the regular (periodic) time interval of updating hardware performance counters. The padding instructions include instructions that do not modify program state information. Examples of the padding instructions are no-operation (nop) instructions, a move instruction that includes a destination operand that matches a source operand, and a Boolean arithmetic instruction that generates a destination result that matches a value of a source operand. Other examples of padding instructions to insert that do not change program execution state information are possible and contemplated.

The number of padding instructions to insert is a constant value based on the duration of the periodic time interval for updates of the hardware performance counters and latency of the padding instruction. In various implementations, the duration of the periodic time interval and the latency of the padding instruction are measured by a number of clock cycles. Therefore, a change in the operating clock frequency does not change the required number of padding instructions. For example, if the duration of the periodic time interval is 1,024 clock cycles and the latency of the padding instruction is 4 clock cycles, then the number of padding instructions to insert is 256 padding instructions (1,024 clock cycles/4 clock cycles per padding instruction). In an implementation, the alignment instrumentation tool 122 is written with the constant number, whereas in another implementation, the alignment instrumentation tool 122 accesses a particular configuration and status register (CSR) that stores the value indicating the number of padding instructions to insert.

Later execution of the tagging instruction by one of parallel data processing circuit 144 and/or the neural processing circuit 146 causes the tagging information to be stored in particular data storage location such as a buffer entry of a buffer or other data structure implemented in a local memory of the corresponding processing circuit. When the instruction of the given type is executed, the corresponding processing circuit also stores one or more of a timestamp and an identifier of a currently used periodic time interval in the buffer entry. The currently used periodic time interval is associated with the updates of hardware performance counters. The corresponding processing circuit also stores one or more of the timestamp and the identifier of the currently used periodic time interval in another buffer used for storage of updates of the information stored in the hardware performance counters. Therefore, using one or more of the timestamps and identifiers of the periodic time intervals, the information provided by the hardware performance counters is correlated with instructions of the source code that have been executed during the identified periodic time intervals.

A later compilation step can convert intermediate code 130 to machine code or bytecode depending on the type of compilation being performed. Machine code is a general term that refers to patterns of bits with different patterns corresponding to different commands, or instructions, to the processing circuit. Bytecode can be used by a software interpreter as well as being suitable for further compilation into machine code. The bytecode can be interpreted, or run, on a virtual machine. In some implementations, compiler 120 includes a version of Low-Level Virtual Machine (LLVM) compiler that provides changes to intermediate representations independent of the high-level programming language of source code 110.

In various implementations, one or more of parallel data processing circuit 144 and neural processing circuit 146 supports a respective machine learning data model that is a trained data model that uses machine learning techniques that rely on one of a recurrent neural network (RNN) structure, a convolutional neural network (CNN) structure, a deep neural network (DNN) structure, and so forth. Each of the machine learning data models executed by one or more of parallel data processing circuit 144 and neural processing circuit 146 uses a corresponding number of input values, hidden layers, parameters (a sum of the number of weights and the number of biases supported by the data model), and number of nodes per layer. Using sequence 132 instead of sequence 112 allows execution behavior parameters 150 to provide statistics about the execution of the machine learning data models such as which hidden layers have memory access bank conflicts, highly divergent execution, or other.

In an implementation, during execution of sequence 132 by one of parallel data processing circuit 144 and neural processing circuit 146, information provided by the hardware performance counters in execution behavior parameters 150 include 24 bank conflicts in a dynamic random-access memory (DRAM) used as shared memory during periodic time interval 715. The combination of the identifier of time interval 715 and the tagging information of the single shared memory access instruction executed in time interval 715 correlates the 24 bank conflicts with the single shared memory access instruction executed in time interval 715. The source of inefficiencies of the parallel data application is now known to developers and users. Developers can tune debugging efforts to the individual instructions that cause inefficiencies during execution. When the source code is modified by the developers to remove the inefficiencies, this modified version of the source code can be executed by one of parallel data processing circuit 144 and neural processing circuit 146 without modification by the alignment instrumentation tool 122.

Figure 2:
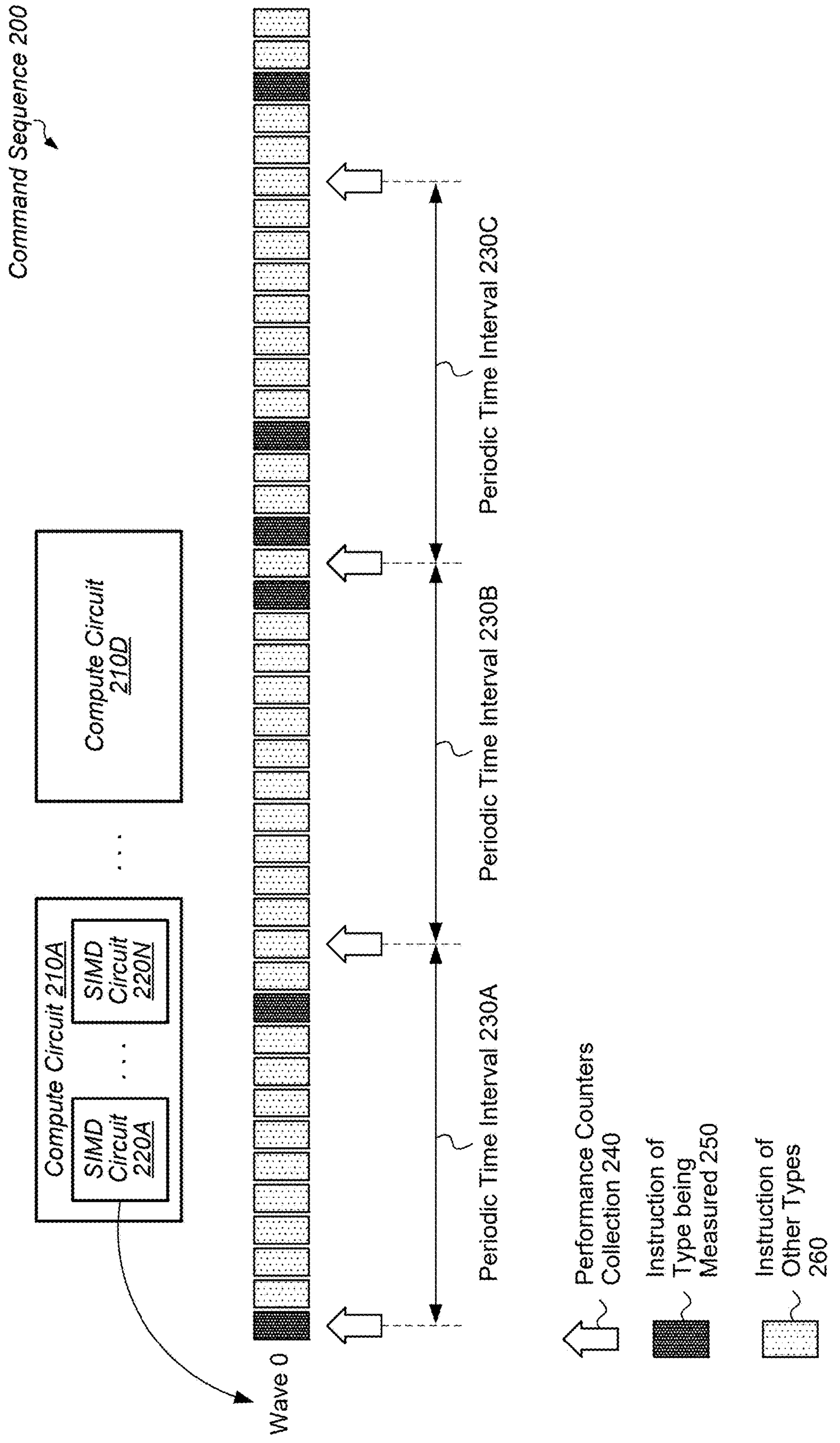
FIG. 2 is a generalized diagram of a command sequence executed by a parallel data processing circuit.

Referring to FIG. 2, a generalized diagram is shown of command sequence 200 for a parallel data processing circuit. As shown, compute circuits 210A-210D execute instructions where a sequence of instructions is shown flowing from left to right. During execution, performance counters collection 240 occur at regular (periodic) time intervals. These collections can be used to generate hardware profile information such as execution behavior parameters 150 (of FIG. 1). The regular (periodic) time intervals are shown as periodic time intervals 230A, 230B and 230C. The duration of time elapsed for each of the periodic time intervals 230A, 230B and 230C (or time intervals 230A-230C) is the same. The duration of time elapsed for each time interval of time intervals 230A-230C can be measured by a count of clock cycles or other converted unit of time.

Multiple processes of a highly parallel data application provide work to be executed on compute circuits 210A-210D. In various implementations, compute circuits 210A-210D are included in a processing circuit with a highly parallel data microarchitecture such as parallel data processing circuit 144 and neural processing circuit 146 (of FIG. 1). Each one of compute circuits 210A-210D includes similar circuitry and components such as the multiple, parallel computational lanes. The multiple, parallel computational lanes are located in the single instruction multiple data (SIMD) circuits 220A-220N. A "SIMD circuit" can also be referred to as a "vector processing circuit." In some implementations, the parallel computational lanes operate in lockstep. In various implementations, the data flow within each of the lanes is pipelined. Pipeline registers are used for storing intermediate results and circuitry for arithmetic logic units (ALUs) perform integer arithmetic, floating-point arithmetic, Boolean logic operations, branch condition comparisons and so forth. These components are not shown for ease of illustration.

Each of the ALUs within a given row across the lanes includes the same circuitry and functionality, and operates on the same instruction, but different data associated with a different thread. A particular combination of the same instruction and a particular data item of multiple data items is referred to as a "work item." A work item is also referred to as a thread. The multiple work items (or multiple threads) are grouped into "wavefronts" or "waves." In some implementations, a wavefront includes instructions of a function call (kernel) that operates on multiple data items concurrently. Each data item is processed independently of other data items, but the same sequence of operations of the subroutine is used. A "workgroup" includes two or more wavefronts. A command processing circuit or a scheduler (not shown) in the compute circuits 210A-210D divides the workgroups into separate wavefronts, which are dispatched to the SIMD circuits 220A-220N (or vector processing circuits 220A-220N).

In the illustrated implementation, a scheduler assigns "Wave 0" to SIMD circuit 220A. The sequence of instructions from left to right illustrates the instructions of Wave 0 being executed by SIMD circuit 220A. The instructions include instruction 250 that has a type of an instruction being measured and aligned. Instruction 260 has a type of instruction that can be measured but not actively aligned to separate time intervals of time intervals 230A-230C. Instruction 260 also has a type of instruction that isn't being measured. Examples of instruction 250 are one or more of shared memory access instructions and conditional control flow instructions. The shared memory can be a local data store of a GPU or other shared data storage area.

Each of time intervals 230A and 230C includes two instructions 250. When instruction 250 is a shared memory access instruction targeting DRAM, the collected number of bank conflicts for time intervals 230A and 230C provides a total number of bank conflicts that occurred within the respective one of time intervals 230A and 230C. However, the number of bank conflicts caused by either one of the two instructions 250 is unknown. Therefore, a developer or user is unable to identify which section of source code is creating the performance reducing bank conflicts.

Figure 3:
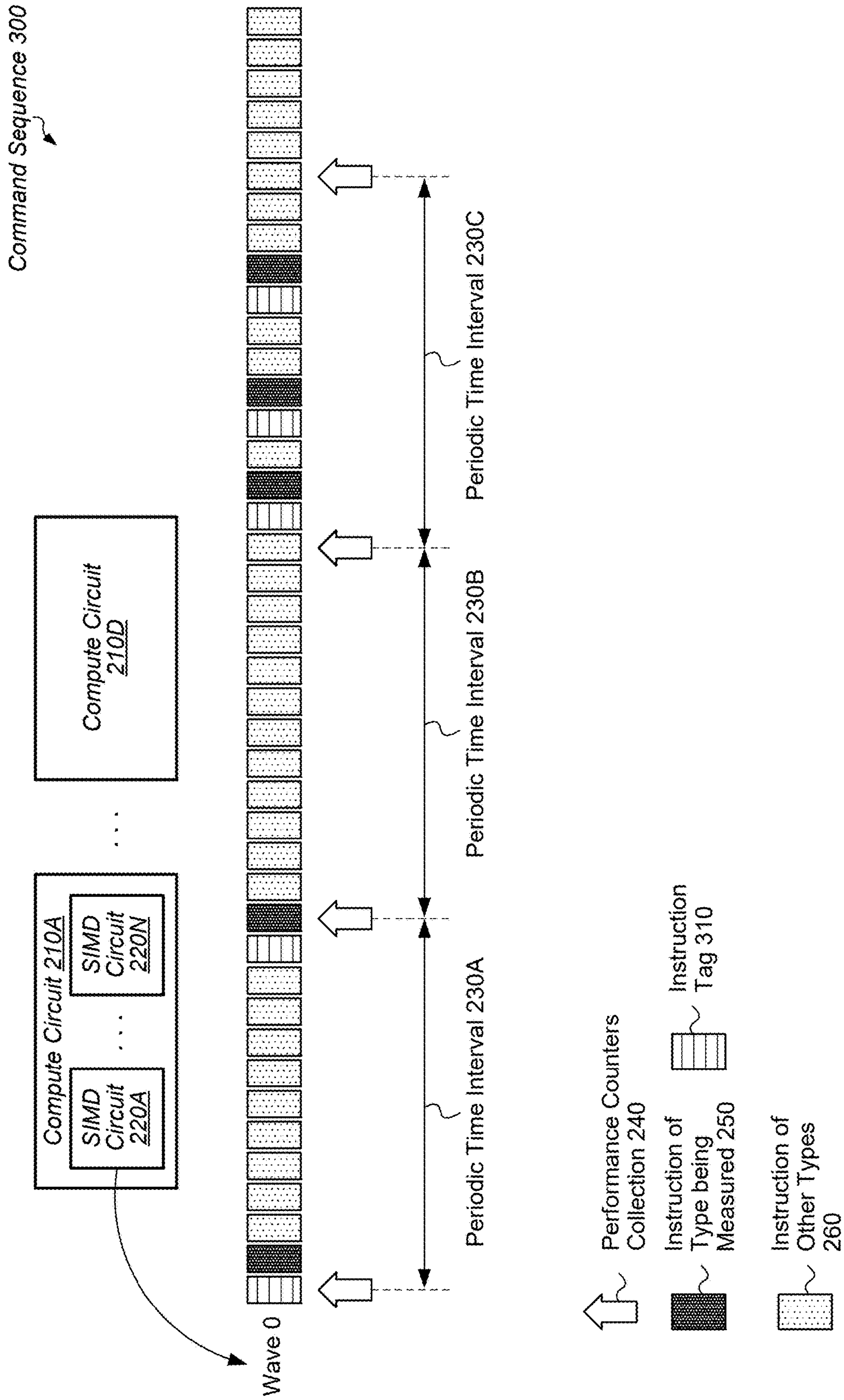
FIG. 3 is a generalized diagram of a command sequence executed by a parallel data processing circuit.

Turning now to FIG. 3, a generalized diagram is shown of command sequence 300 for a parallel data processing circuit. Components and circuitry previously described are numbered identically. As shown, each of the instructions 250 has a tagging instruction 310 inserted ahead of it or placed in an immediate in program order older position in the sequence of instructions. Therefore, the instructions 250 can be located in the source code. When executing instructions of an alignment instrumentation tool of the compiler, a host processing circuit, such as a general-purpose CPU, inserts the tagging instructions 310 in the source code that provides identification of the instruction 250 in source code. Examples of the tagging information include one or more of a process identifier (ID), a name of the application or an ID of the application, a version of the application, a compute/graphics type of work, a compute circuit identifier, a SIMD circuit identifier, a wavegroup identifier, a wavefront (wave) identifier, an integer flag or line number or other indicator of the instruction of the given type being measured, a program counter of the instruction of the given type, a hash value based on at least a portion of the program counter of the instruction of the given type, and so on. Therefore, tagging instruction 310 provides identification of at least SIMD circuit 220A and compute circuit 210A.

Later execution of the tagging instruction 310 by the parallel data processing circuit causes the tagging information to be stored in a particular data storage location such as a buffer entry of a buffer or other data structure implemented in a local memory of the parallel data processing circuit. When instruction 250 is executed, the parallel data processing circuit also stores one or more of a timestamp and an identifier of a currently used periodic time interval in the buffer entry. The timestamp or identifier of the periodic time interval identifies one of the periodic time intervals 230A-230C. The currently used periodic time interval is associated with the updates of hardware performance counters. The parallel data processing circuit also stores one or more of the timestamp and the identifier of the currently used periodic time interval in another buffer used for storage of updates of the hardware performance counters. Therefore, using one or more of the timestamps and identifiers of the periodic time intervals, the information provided by the hardware performance counters is correlated with instructions of the source code that have been executed during the identified periodic time intervals such as periodic time intervals 230A-230C.

Figure 4:
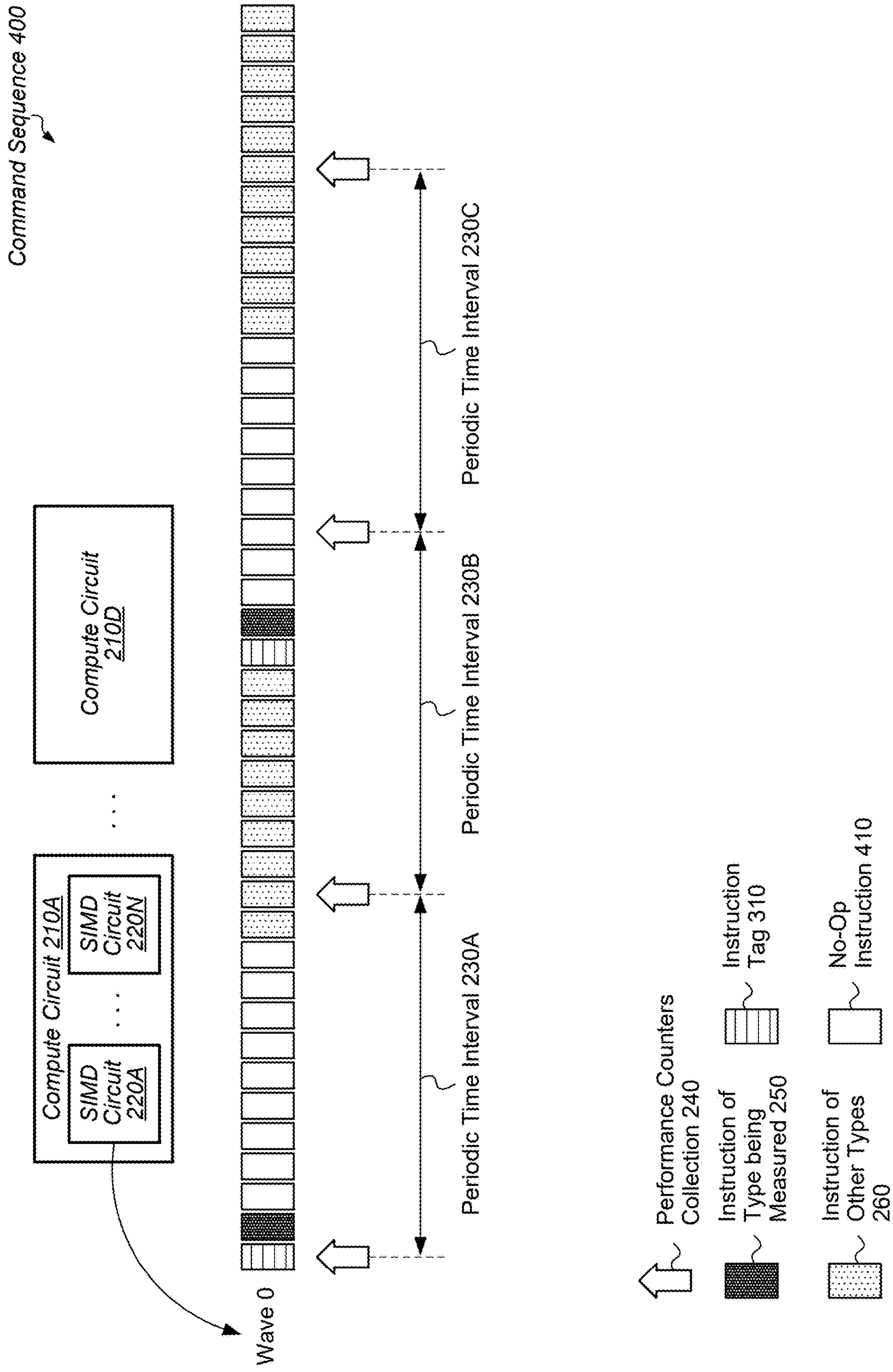
FIG. 4 is a generalized diagram of a command sequence that efficiently aligns execution of instructions of a given type with performance counter updates of a parallel data processing circuit.

Referring to FIG. 4, a generalized diagram is shown of command sequence 400 that efficiently aligns execution of instructions of a given type with performance counter updates of a parallel data processing circuit. Components and circuitry previously described are numbered identically. As shown, each of the instructions 250 has a padding instruction 410 inserted after it or placed in an immediate in program order younger positions in the sequence of instructions. The padding instructions 410 include instructions that do not modify program state information. Examples of the padding instructions 410 are no-operation (nop) instructions, a move instruction that includes a destination operand that matches a source operand, and a Boolean arithmetic instruction that generates a destination result that matches a value of a source operand. Other examples of padding instructions 410 to insert that do not change program execution state information are possible and contemplated.

When executing instructions of the alignment instrumentation tool of the compiler, such as the alignment instrumentation tool 122 of compiler 120 (of FIG. 1), the host processing circuit inserts the padding instructions 410 in the source code. With the addition of the padding instructions 410, the instructions 250 are further spread out as to have at most one instruction 250 within any one of time intervals 230A-230C. It is possible to have the padding instructions cause no instruction 250 to be executed within one or more of time intervals 230A-230C. Now, when collections 240 of statistics (metrics or parameters) are provided by hardware performance counters, such as a total number of bank conflicts in time interval 230A or time interval 230B, it is known which instruction 250, such as a shared memory access instruction, caused the total number of bank conflicts. Although performance reduces due to the insertion of padding instructions 410, it is acceptable, since a more accurate analysis of the original source code is provided. A later version of the source code can be compiled without the alignment instrumentation tool of the compiler after modifications have been made based on the more accurate analysis provided by the collections 240.

In various implementations, the number of padding instructions 410 to add (or insert) in the source code after instruction 250 is based on the duration of time intervals 230A-230C less the sum of the duration of executing the instruction 250 and the duration of executing two tagging instructions 310. In some implementations, the duration for executing the instructions is one clock cycle, which is one pipe stage. In the illustrated implementation, there are 11 clock cycles between collections 240 of statistics (metrics or parameters) stored in hardware performance counters. Therefore, the number of padding instructions 410 used is 11−(1+2) is 8 padding instructions.

Later execution of the tagging instruction 310 and padding instructions 410 by the parallel data processing circuit causes the tagging information to be stored in a particular data storage location such as a buffer entry of a buffer or other data structure implemented in a local memory of the parallel data processing circuit. When instruction 250 is executed, the parallel data processing circuit also stores one or more of a timestamp and an identifier of a currently used periodic time interval in the buffer entry. The timestamp or identifier of the periodic time interval identifies one of the periodic time intervals 230A-230C. The currently used periodic time interval is associated with the updates of hardware performance counters.

The parallel data processing circuit also stores one or more of the timestamp and the identifier of the currently used periodic time interval in another buffer used for storage of updates of the hardware performance counters. Therefore, using one or more of the timestamps and identifiers of the periodic time intervals, the information provided by the hardware performance counters is correlated with instructions of the source code that have been executed during the identified periodic time intervals such as periodic time intervals 230A-230C. In an implementation, during execution of the modified sequence of instructions by the parallel data processing circuit, information provided by the hardware performance counters include 24 bank conflicts in a dynamic random-access memory (DRAM) used as shared memory during periodic time interval 715 that identifies periodic time interval 230B. The combination of the identifier of time interval 715 (periodic time interval 230B) and the tagging information of the single shared memory access instruction (instruction 250) executed in time interval 715 correlates the 24 bank conflicts with the single shared memory access instruction executed in time interval 715. The source of inefficiencies of the parallel data applications is now known to developers and users.

Figure 5:
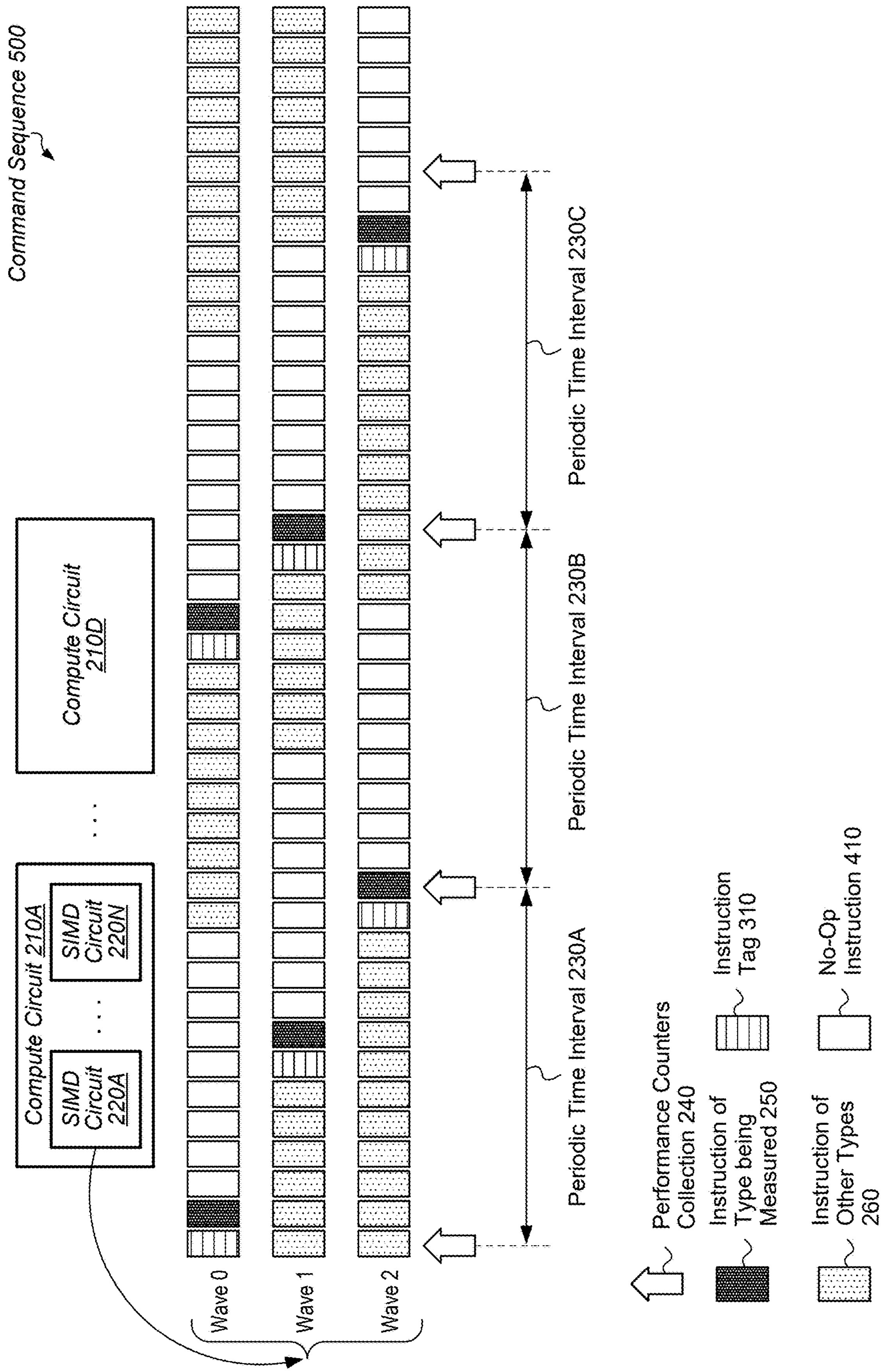
FIG. 5 is a generalized diagram of a command sequence that efficiently aligns execution of instructions of a given type with performance counter updates of a parallel data processing circuit.

Turning now to FIG. 5, a generalized diagram is shown of command sequence 500 that efficiently aligns execution of instructions of a given type with performance counter updates of a parallel data processing circuit. Components and circuitry previously described are numbered identically. In the illustrated implementation, a command processing circuit or other scheduler (not shown) assigns at least "Wave 0," "Wave 1," and "Wave 2" to SIMD circuit 220A. The sequence of instructions from left to right illustrates the interleaving execution of instructions of Wave 0, Wave 1 and Wave 2 being executed by SIMD circuit 220A. Within any clock cycle (or pipe stage), a single instruction is being executed, rather than three instructions. Therefore, over time, the instruction sequences would open up to illustrate the execution of a single instruction by the multiple parallel lanes of SIMD circuit 220A.

Within a particular wave of Wave 0, Wave 1 and Wave 2, it is possible to distinguish which instruction 250 is associated with particular parameters of collections 240. However, each of time intervals 230A, 230B and 230C includes two instructions 250 spread across Wave 0, Wave 1 and Wave 2. The number of bank conflicts caused by either one of the two instructions 250 is unknown. Therefore, a developer or user is unable to identify which section of source code is creating the performance reducing bank conflicts.

Figure 6:
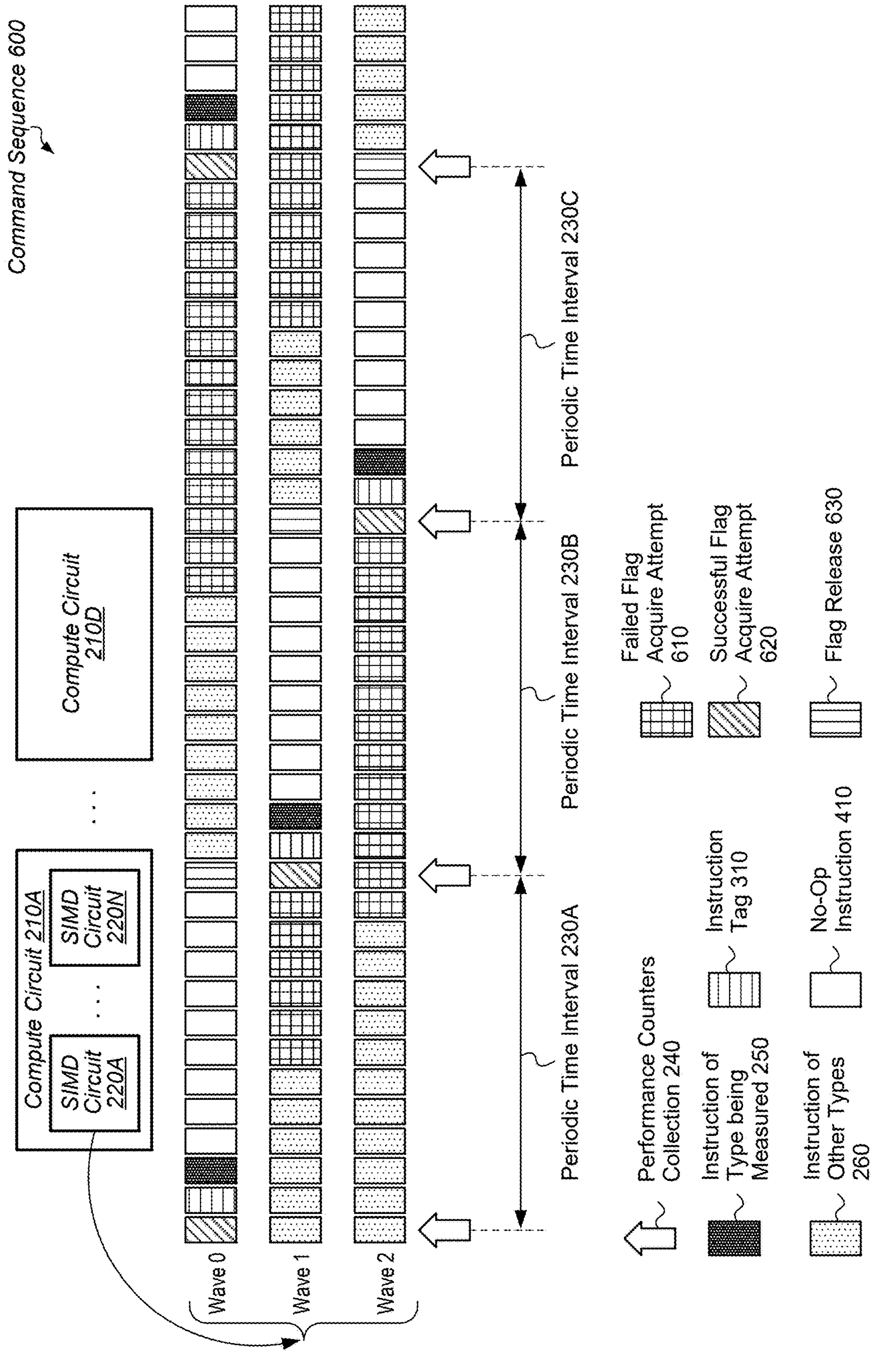
FIG. 6 is a generalized diagram of a command sequence that efficiently aligns execution of instructions of a given type with performance counter updates of a parallel data processing circuit.

Referring to FIG. 6, a generalized diagram is shown of command sequence 600 that efficiently aligns execution of instructions of a given type with performance counter updates of a parallel data processing circuit. Components and circuitry previously described are numbered identically. In the illustrated implementation, the sequence of instructions from left to right for Wave 0, Wave 1 and Wave 2 include synchronization instructions 610, 620 and 630. Instructions 610 and 620 are flag acquire instructions with instruction 610 illustrating a failed attempt result and instruction 620 illustrating a successful attempt result. For example, in time interval 230A, Wave 0 has as its first instruction, flag acquire instruction 610 with a successful attempt result. In time interval 230A, Wave 1 has six flag acquire instructions 620 with a failed attempt result. In time interval 230A, Wave 2 has single flag acquire instructions 620 with a failed attempt result.

At the start of time interval 230B, Wave 0 executes a flag release instruction 630, which allows another source (wave) to execute on SIMD circuit 220A. As shown, Wave 1 obtains permission to execute on SIMD circuit 220A and the process repeats. Now, when collections 240 of statistics (metrics or parameters) are provided by hardware performance counters, such as a total number of bank conflicts in any of the time intervals 230A, 230B or 230C, it is known which instruction 250, such as a shared memory access instruction, and which wave (Wave 0, Wave 1, or Wave 2) caused the total number of bank conflicts.

Figure 7:
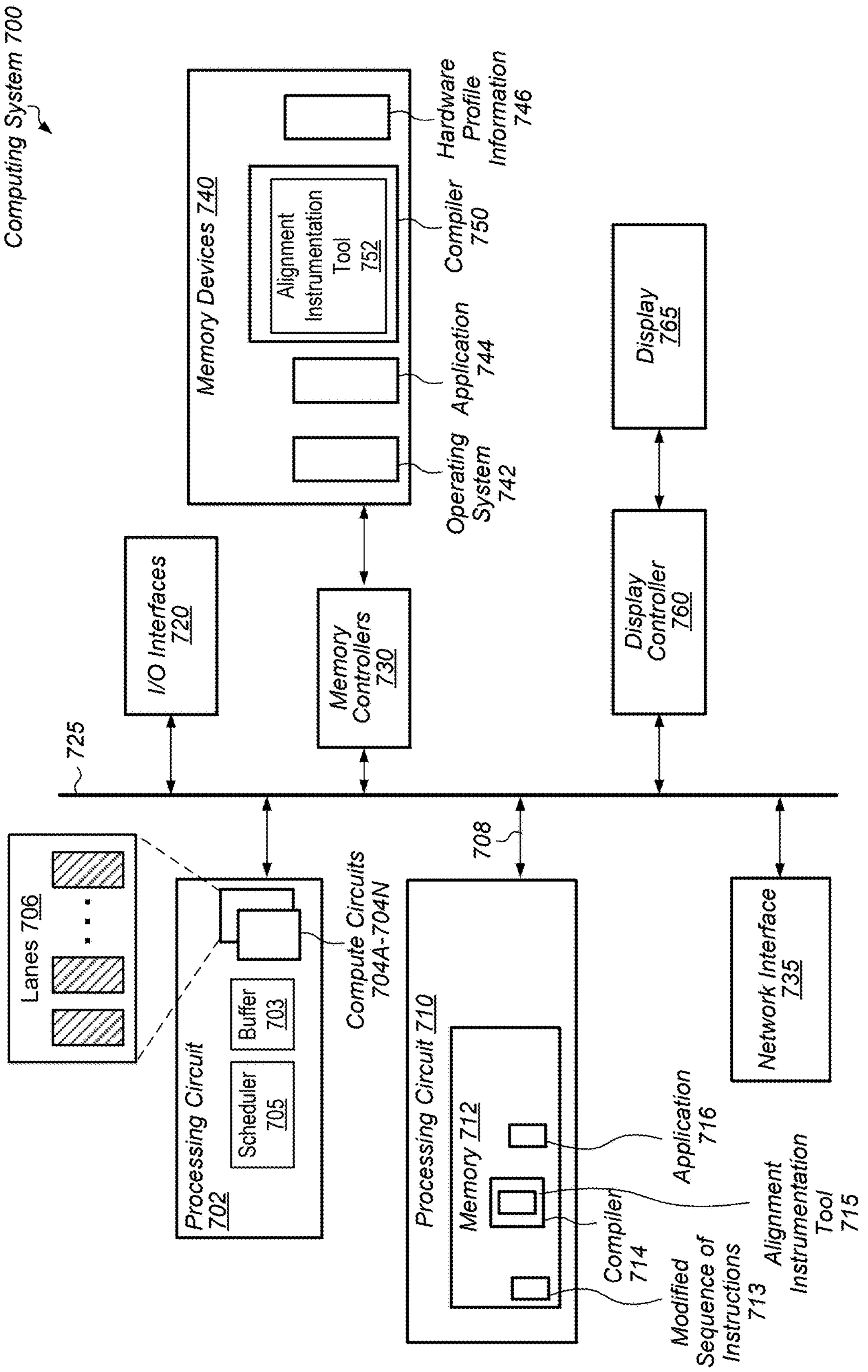
FIG. 7 is a generalized diagram of a computing system that efficiently aligns execution of instructions of a given type with performance counter updates of a parallel data processing circuit.

Turning now to FIG. 7, a generalized diagram is shown of an implementation of computing system 700 that efficiently aligns execution of instructions of a given type with performance counter updates of a parallel data processing circuit. In an implementation, computing system 700 includes at least processing circuits 702 and 710, input/output (I/O) interfaces 720, bus 725, network interface 735, memory controllers 730, memory devices 740, display controller 760, and display 765. Processing circuits 702 and 710 are representative of any number of processing circuits which are included in computing system 700. In other implementations, computing system 700 includes other components and/or computing system 700 is arranged differently. For example, power management circuitry, and phased locked loops (PLLs) or other clock generating circuitry are not shown for ease of illustration. In various implementations, the components of the computing system 700 are on the same die such as a system-on-a-chip (SOC). In other implementations, the components are individual dies in a system-in-package (SiP) or a multi-chip module (MCM). A variety of computing devices use the computing system 700 such as a desktop computer, a laptop computer, a server computer, a tablet computer, a smartphone, a gaming device, a smartwatch, and so on.

In one implementation, the processing circuit 702 is a parallel data processing circuit with a highly parallel data microarchitecture, such as a graphics processing unit (GPU). The processing circuit 702 can be a discrete device, such as a dedicated GPU (dGPU), or the processing circuit 702 can be integrated (an iGPU) in the same package as another processing circuit. In an implementation, the other processing circuit is the processing circuit 710, which can be a central processing unit (CPU). Other parallel data processing circuits that can be included in computing system 700 include digital signal processing circuits (DSPs), field programmable gate arrays (FPGAs), application specific integrated circuits (ASICs), and so forth. Although not shown, it is also possible that computing system 700 includes a neural processing circuit that executes machine learning data models in addition to processing circuit 702.

In various implementations, the processing circuit 702 includes multiple compute circuits 704A-704N, each including similar circuitry and components such as the multiple, parallel computational lanes 706 within a corresponding SIMD circuit. In some implementations, processing circuit 702 includes 16 compute circuits 704A-704N, each with four SIMD circuits. In other implementations, other numbers of compute circuits and SIMD circuits are used based on design requirements.

As described earlier regarding compute circuits 210A-210D (of FIGS. 2-6), the parallel computational lanes 706 (or lanes 706) operate in lockstep. In various implementations, the data flow within each of the lanes 706 is pipelined. Pipeline registers are used for storing intermediate results and circuitry for arithmetic logic units (ALUs) perform integer arithmetic, floating-point arithmetic, Boolean logic operations, branch condition comparisons and so forth. The hardware, such as circuitry, of scheduler 705 assigns workgroups to compute circuits 704A-704N. A scheduler within compute circuits 704A-704N divides workgroups into separate wavefronts and assigns the wavefronts (or waves) to the separate SIMD circuits. The high parallelism offered by the hardware of the compute circuits 704A-704N is used for real-time data processing. Examples of real-time data processing are rendering multiple pixels, image blending, pixel shading, vertex shading, geometry shading and executing a variety of types of machine learning data models.

In some implementations, scheduler 705 is referred to as a shader sequencer (SQ). In an implementation, the functionality of scheduler 705 is shared by compute circuits 704A-704N, whereas in another implementation, each one of the compute circuits 704A-704N has its own scheduler. As the shader sequencer, scheduler 705 inserts various information, such as tokens into a memory buffer (such as local memory buffer 703 of processing circuit 702) which can be accessed by various debugging tools and later provide information in hardware profile information 746 in memory devices 740. To do so, as the shader sequencer, scheduler 705 utilizes shader sequencer thread tracing (SQTT) to create streams with SQTT packets. The tokens stored in the memory buffer 703 are used to identify when to collect information stored in hardware performance counters, such as at regular (periodic) time intervals, and where to store the collected information to correlate the information with the particular time interval. These tokens are used in an implementation to initiate and monitor collections 240 (of FIGS. 2-6). In other implementations, other techniques and identifiers are used to generate collections information, such as collection 240, to provide information indicating dynamic hardware behavior of processing circuit 702. In some implementations, the tokens include tagging information such as information generated by executing tagging instruction 310 (of FIGS. 3-6).

Examples of the tagging information that can be used in the tokens include one or more of a process identifier (ID), a name of the application or an ID of the application, a version of the application, a compute/graphics type of work, a compute circuit identifier, a SIMD circuit identifier, a wavegroup identifier, a wavefront (wave) identifier, an integer flag or line number or other indicator of the instruction of the given type being measured, a program counter of the instruction of the given type, a hash value based on at least a portion of the program counter of the instruction of the given type, and so on. Later execution of the tagging instruction by processing circuit 702 causes the tagging information and/or tokens to be stored in a particular data storage location such as a buffer entry of buffer 703 or other data structure implemented in a local memory of processing circuit 702.

When the instruction of the given type (such as instruction 250 of FIGS. 2-6) is executed, processing circuit 702 also stores one or more of a timestamp and an identifier of a currently used periodic time interval in the buffer entry. The currently used periodic time interval is also associated with the updates of hardware performance counters (not shown) distributed across processing circuit 702. These updates are stored in hardware profile information 746 in memory devices 740. Processing circuit 702 also stores one or more of the timestamp and the identifier of the currently used periodic time interval in hardware profile information 746. A copy of hardware profile information 746 can be temporarily stored in another buffer of processing circuit 702. Therefore, using one or more of the timestamps and identifiers of the periodic time intervals, the information provided by the hardware performance counters in hardware profile information 746 is correlated with instructions of the source code that have been executed by processing circuit 702 during the identified periodic time intervals.

In some implementations, as the shader sequencer (SQ), scheduler 705 generates a variety of types of separate tokens, each including one of the multiple types of tagging information and collected updates of the hardware performance counters. The updates are a number of increments for a corresponding parameter of the hardware performance counters since the last sample was taken such as at the end of the immediately previous periodic time interval. In an implementation, execution of the tagging instruction, such as tagging instruction 310 (of FIGS. 3-6), causes scheduler 705 to generate a user token and store it in a buffer entry of buffer 703. Examples of the tagging information included in the user token are one or more of a process identifier (ID), a name of the application or an ID of the application, a version of the application, a compute/graphics type of work, a compute circuit identifier, a SIMD circuit identifier, a wavegroup identifier, a wavefront (wave) identifier, an integer flag or line number or other indicator of the instruction of the given type being measured, a program counter of the instruction of the given type, a hash value based on at least a portion of the program counter of the instruction of the given type, and so on.

In an implementation, as the shader sequencer (SQ), scheduler 705 generates a performance counter token at the end of each periodic time interval used for updating the hardware performance counters. Examples of the tagging information stored in the performance counter token are one or more of a compute circuit identifier, a SIMD circuit identifier, a wavegroup identifier, and a wavefront (wave) identifier. Additionally, in some implementations, scheduler 705 stores one or more updated values (counts) of the hardware performance counters in the performance counter token. In various implementations, scheduler 705 also stores one or more of a timestamp and an identifier of a currently used periodic time interval in the user token and the performance counter token. Therefore, the information stored in the user token and the performance counter token correlate with one another. At a later point in time, these tokens can be moved to hardware profile information 746 in memory devices 740. A variety of types of debugging tools can access to hardware profile information 746 to allow developers to remove inefficiencies in the application 744.

In one implementation, processing circuit 710 is a general-purpose processing circuit, such as a central processing unit (CPU), with any number of processing circuit cores that include circuitry for executing program instructions. Memory 712 represents a local hierarchical cache memory subsystem. Memory 712 stores source data, intermediate results data, results data, and copies of data and instructions stored in memory devices 740. For example, the memory 712 stores the compiler 714 and the application 716, which are copies of the compiler 750 and the application 744 stored in the memory devices 740. Processing circuit 710 is coupled to bus 725 via interface 708. Processing circuit 710 receives, via interface 708, copies of various data and instructions, such as shader programs, the operating system 742, one or more device drivers, one or more applications such as application 744, and/or other data and instructions.

The processing circuit 710 retrieves a copy of the compiler 750 from the memory devices 740, and the processing circuit 710 stores this copy as compiler 714 in memory 712. The compiler 714 includes the alignment instrumentation tool 715, which is a copy of the alignment instrumentation tool 752. The processing circuit 710 retrieves a copy of the application 744 from the memory devices 740, and the processing circuit 710 stores this copy as application 716 in memory 712. One example of the application 716 is one of a variety of types of a highly parallel data application. When the instructions of the compiler 714 are executed by processing circuit 710, processing circuit 710 compiles the application 716. As part of the compiling, processing circuit 710 inserts a tagging instruction that provides identification of an instruction of a given type in source code and a corresponding time interval when updates of hardware performance counters occurred. As described earlier, an example of the tagging instruction is tagging instruction 310 (of FIG. 3) and examples of the tagging information were provided earlier. Additionally, the hardware performance counters (not shown) distributed across at least processing circuit 702, and in some implementations, the instructions of the given type include one or more of shared memory access instructions and conditional control flow instructions.

Processing circuit 710 also inserts, in program order, a number of padding instructions that causes a number of clock cycles between execution of consecutive in-program-order instructions of the given type to be equal to or greater than a number of clock cycles of the periodic time interval used for updating the hardware performance counters and providing hardware profile information 746. The padding instructions include instructions that do not modify program state information. In various implementations, when executed by processing circuit 710, the instructions of the alignment instrumentation tool 715 has the same functionality of alignment instrumentation tool 122 (of FIG. 1) and causes the modified sequence of instructions 713 to include instruction (or translated command) sequences similar to command sequences 400 and 600 (of FIGS. 4 and 6). The results of the collections of hardware performance counters in at least processing circuit 702 are provided in the hardware profile information 746 in memory devices 740.

In some implementations, computing system 700 utilizes a communication fabric ("fabric"), rather than the bus 725, for transferring requests, responses, and messages between the processing circuits 702 and 710, the I/O interfaces 720, the memory controllers 730, the network interface 735, and the display controller 760. When messages include requests for obtaining targeted data, the circuitry of interfaces within the components of computing system 700 translates target addresses of requested data. In some implementations, the bus 725, or a fabric, includes circuitry for supporting communication, data transmission, network protocols, address formats, interface signals and synchronous/asynchronous clock domain usage for routing data.

Memory controllers 730 are representative of any number and type of memory controllers accessible by processing circuits 702 and 710. While memory controllers 730 are shown as being separate from processing circuits 702 and 710, it should be understood that this merely represents one possible implementation. In other implementations, one of memory controllers 730 is embedded within one or more of processing circuits 702 and 710 or it is located on the same semiconductor die as one or more of processing circuits 702 and 710. Memory controllers 730 are coupled to any number and type of memory devices 740.

Memory devices 740 are representative of any number and type of memory devices. For example, the type of memory in memory devices 740 includes Dynamic Random Access Memory (DRAM), Static Random Access Memory (SRAM), NAND Flash memory, NOR flash memory, Ferroelectric Random Access Memory (FeRAM), or otherwise. Memory devices 740 store at least instructions of an operating system 742, one or more device drivers, and application 744. In some implementations, application 744 is a highly parallel data application such as a video graphics application, a shader application, or other. Copies of these instructions can be stored in a memory or cache device local to processing circuit 710 and/or processing circuit 702.

I/O interfaces 720 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 720. Such peripheral devices include (but are not limited to) displays, keyboards, mice, printers, scanners, joysticks or other types of game controllers, media recording devices, external storage devices, and so forth. Network interface 735 receives and sends network messages across a network.

Regarding the methods 800-900 (of FIGS. 8-9), a computing system includes a first processing circuit and a second processing circuit. In some implementations, the first processing circuit has a general-purpose microarchitecture, and the second processing circuit is a parallel data processing circuit with a highly parallel data microarchitecture. Examples of the first processing circuit are processing circuit 142 (of FIG. 1) and processing circuit 710 (of FIG. 7). Examples of the second processing circuit are parallel data processing circuit 144 and processing circuit 146 (of FIG. 1), a processing circuit with compute circuits 210A-210D (of FIGS. 2-6) and processing circuit 702 (of FIG. 7).

Figure 8:
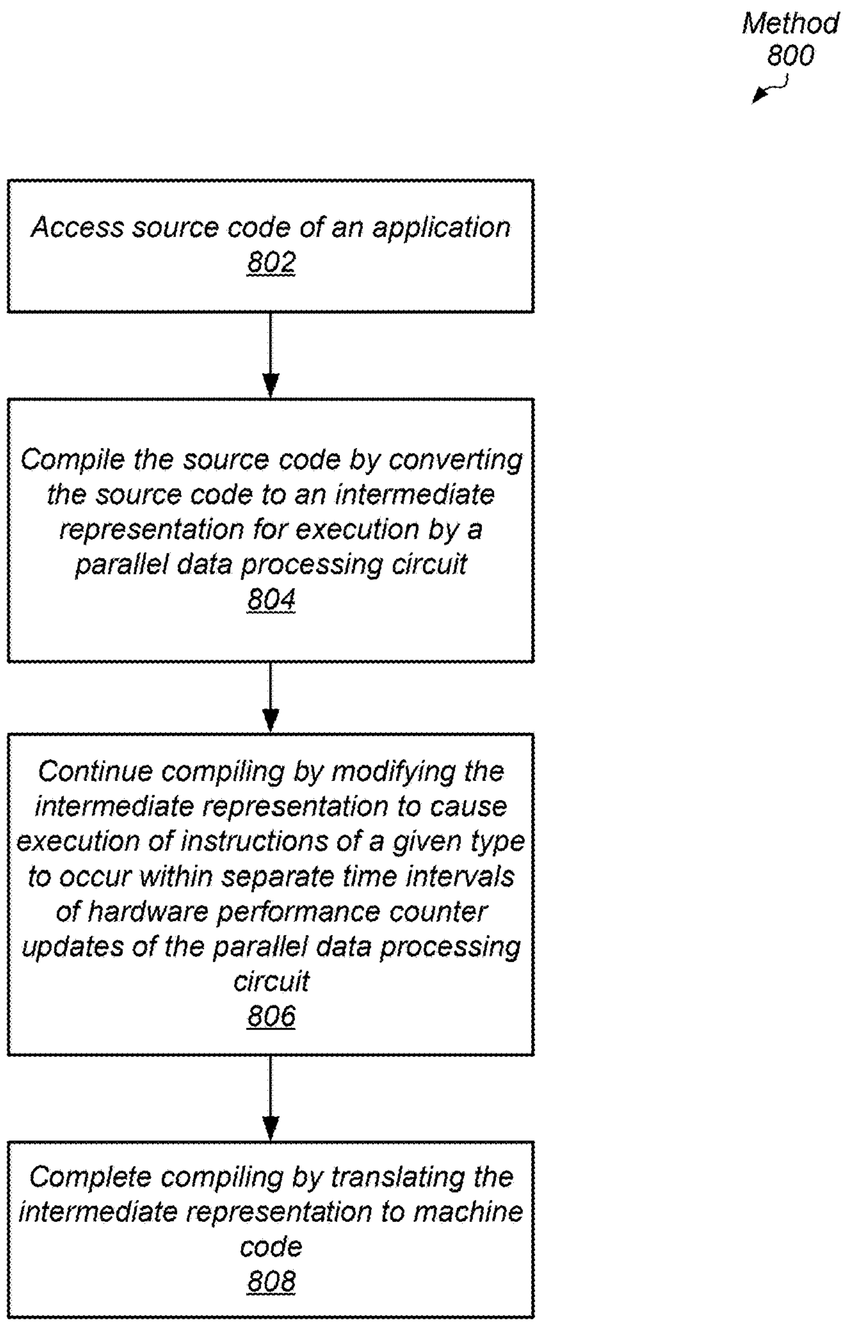
FIG. 8 is a generalized block diagram of a method for efficiently aligning execution of instructions of a given type with performance counter updates of a parallel data processing circuit.

Referring to FIG. 8, a generalized block diagram is shown of a method 800 for efficiently aligning performance counter updates of parallel data processing circuits. For purposes of discussion, the steps in this implementation (as well as FIG. 9) are shown in sequential order. However, in other implementations some steps occur in a different order than shown, some steps are performed concurrently, some steps are combined with other steps, and some steps are absent.

The first processing circuit accesses a copy of the source code of an application (block 802). As described earlier, examples of the first processing circuit are processing circuits with a general-purpose microarchitecture such as processing circuit 142 (of FIG. 1) and processing circuit 710 (of FIG. 7). One or more designers write software applications in a high-level language such as C, C++, Fortran, or otherwise. When the circuitry of the first processing circuit executes the instructions of an operating system, the circuitry retrieves a copy of the application from system memory and stores the copy in a local hierarchical cache memory subsystem of the first processing circuit. In an implementation, the application is a highly parallel data application, such as a shader application. To compile the source code, a command with any necessary options is executed. The command can be entered at a prompt by a user or placed within a scripting language.

When the circuitry of the first processing circuit executes the instructions of a compiler, the first processing circuit begins compiling the application by converting the source code to an intermediate representation (block 804). In various implementations, the compiler includes instructions of an algorithm that implements a tool such as the alignment instrumentation tool 122 of compiler 120 (of FIG. 1). When the circuitry of the first processing circuit executes the instructions of the compiler, the first processing circuit performs syntactic and semantic processing as well as some optimizations. In an implementation, this compilation step is completely static, and the lower-level representation is an output of a front-end phase to be further compiled statically into machine code. In another implementation, this compilation step is static upfront where the lower-level representation is bytecode to be further compiled dynamically into machine code by the circuitry executing the instructions of a JIT compiler within a virtual machine.

When the circuitry of the first processing circuit executes the instructions of the compiler, the first processing circuit continues compiling by modifying the intermediate representation to cause execution of instructions of a given type to occur within separate time intervals of hardware performance counter updates of the parallel data processing circuit (block 806). The first processing circuit modifies the machine code in a similar manner as shown earlier to modify the command sequences 200-600 (of FIGS. 2-6). For example, the first processing circuit modifies a first sequence of instructions to create a second sequence of instructions by adding one or more padding instructions in the first sequence of instructions. The insertion of one or more padding instructions causes a duration between execution of consecutive in program order instructions of a given type to increase. In an implementation, the one or more padding instructions cause the duration to be equal to or greater than a periodic time interval for updating hardware performance counters.

The padding instructions include instructions that do not modify program state information such as are no-operation (nop) instructions, a move instruction that includes a destination operand that matches a source operand, and a Boolean arithmetic instruction that generates a destination result that matches a value of a source operand. Other examples of padding instructions to insert that do not change program execution state information are possible and contemplated. The instructions of the given type include one or more of shared memory access instructions and conditional control flow instructions. The first processing circuit inserts a tagging instruction that identifies the instruction of the given type in source code and in the hardware performance counters. In some implementations, the tagging instruction identifies a compute circuit of the second processing circuit, which is a parallel data processing circuit.

When the circuitry of the first processing circuit executes the instructions of a compiler, the first processing circuit completes compiling by translating the intermediate representation to code (block 808) that is executable by hardware. The first processing circuit performs more transformations and optimizations for a particular computer architecture and processing circuit design. For example, the first processing circuit generates at least a portion of the machine code for execution by the second processing circuit. The way the machine code is executed to reach peak performance differs based on the particular hardware configuration of the second processing circuit. As described earlier, the first processing circuit uses libraries with their own application program interfaces (APIs).

Figure 9:
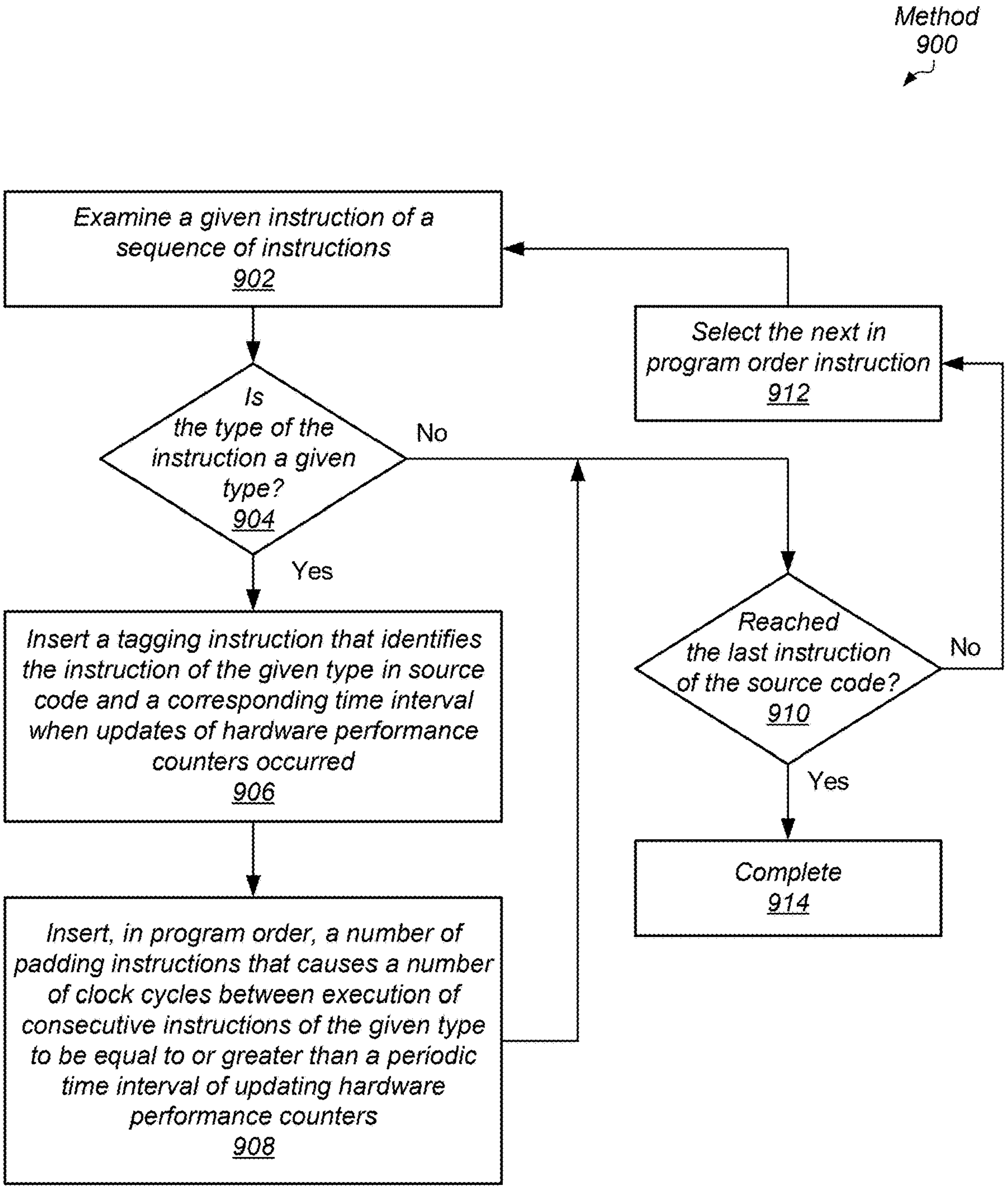
FIG. 9 is a generalized block diagram of a method for efficiently aligning execution of instructions of a given type with performance counter updates of a parallel data processing circuit.

Turning now to FIG. 9, a generalized block diagram is shown of a method 900 for efficiently aligning performance counter updates of parallel data processing circuits. When the circuitry of the first processing circuit executes the instructions of a compiler, the processing circuit examines a given instruction of a sequence of instructions (block 902). Examples of the first processing circuit and the second processing circuit were provided earlier. If the type of the instruction is a given type ("yes" branch of the conditional block 904), then the processing circuit inserts a tagging instruction used to identify the instruction of the given type in source code and a corresponding time interval when updates of hardware performance counters occurred (block 906). In some implementations, the instructions of the given type include one or more of shared memory access instructions and conditional control flow instructions. Examples of the tagging information stored during later execution of the tagging instruction include one or more of a process identifier (ID), a name of the application or an ID of the application, a version of the application, a compute/graphics type of work, a compute circuit identifier, a SIMD circuit identifier, a wavegroup identifier, a wavefront (wave) identifier, an integer flag or line number or other indicator of the instruction of the given type being measured, a program counter of the instruction of the given type, a hash value based on at least a portion of the program counter of the instruction of the given type, and so on.

Later execution of the tagging instruction in the modified instructions by the second processing circuit causes the tagging information to be stored in a particular data storage location such as a buffer entry of a buffer or other data structure implemented in a local memory of the second processing circuit. When the instruction of the given type is executed, the second processing circuit also stores one or more of a timestamp and an identifier of a currently used periodic time interval in the buffer entry. The currently used periodic time interval is associated with the updates of hardware performance counters. The second processing circuit also stores one or more of the timestamp and the identifier of the currently used periodic time interval in another buffer used for storage of updates of the hardware performance counters. Therefore, using one or more of the timestamps and identifiers of the periodic time intervals, the information provided by the hardware performance counters is correlated with instructions of the source code that have been executed during the identified periodic time intervals.

During compilation, the first processing circuit inserts, in program order, a number of padding instructions that causes a number of clock cycles between execution of consecutive instructions of the given type to be equal to or greater than a periodic time interval of updating hardware performance counters (block 908). Afterward, control flow of method 900 moves to conditional block 910. Similarly, if the type of the instruction is not the given type ("no" branch of the conditional block 904), and the first processing circuit has not yet reached the last instruction of the source code ("no" branch of the conditional block 910), then the processing circuit selects the next in program order instruction (block 912). Afterward, control flow of method 900 returns to block 902 where the first processing circuit examines the selected instruction as the given instruction of a sequence of instructions. If the processing circuit has reached the last instruction of the source code ("yes" branch of the conditional block 910), then the compilation completes (block 914).

It is noted that one or more of the above-described implementations include software. In such implementations, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g., Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various implementations, program instructions include behavioral-level descriptions or register-transfer level (RTL) descriptions of the hardware functionality in a high-level programming language such as C, or a design language (HDL) such as Verilog, VHDL, or database format such as GDS II stream format (GDSII). In some cases, the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware-based type emulator from such vendors as Cadence®, EVE®, and Mentor Graphics®.

Although the implementations above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:
circuitry configured to:
access a first sequence of instructions of program instructions;
generate a second sequence of instructions by modifying the first sequence of instructions to add one or more padding instructions; and
generate executable code from the second sequence of instructions for execution by processing circuitry;
wherein the one or more padding instructions are added based on a hardware performance counter update interval and cause executions of instructions of a given type to occur in different update intervals.

2. The apparatus as recited in claim 1, wherein the circuitry is configured to add one or more tagging instructions that identify corresponding instructions of the given type and correlate the corresponding instructions with information collected by the one or more hardware performance counters.

3. The apparatus as recited in claim 2, wherein the tagging information identifies a location of the corresponding instruction of the given type in source code.

4. The apparatus as recited in claim 2, wherein during execution of the machine executable code by the processing circuitry, the processing circuitry is configured to store an identification of the one of the time intervals in:
a first data storage location that stores the tagging information for the corresponding instruction of the given type; and
a second data storage location that stores the information collected by the one or more hardware performance counters during the one of the time intervals.

5. The apparatus as recited in claim 4, wherein the processing circuitry is configured to store, in the first data storage location, an identification of a compute circuit of the processing circuitry that executed the corresponding instruction of the given type.

6. The apparatus as recited in claim 1, wherein the instructions of the given type comprise one or more of shared memory access instructions or conditional control flow instructions.

7. The apparatus as recited in claim 1, wherein the one or more padding instructions comprise instructions that do not modify program state information.

8. A method, comprising:
accessing, by a processing circuit, a first sequence of instructions of program instructions;
modifying, by the processing circuit, the first sequence of instructions to create a second sequence of instructions by adding one or more padding instructions; and
generating, by the processing circuit, the second sequence of instructions into executable code for execution by processing circuitry,
wherein the one or more padding instructions are added based on a hardware performance counter update interval and cause executions of instructions of a given type to occur in different update intervals.

9. The method as recited in claim 8, further comprising generating one or more tagging instructions, wherein the one or more tagging instructions that identify corresponding instructions of the given type and correlate the corresponding instructions with information collected by the one or more hardware performance counters.

10. The method as recited in claim 2, wherein the tagging information identifies a location of the corresponding instruction of the given type in source code.

11. The method as recited in claim 9, wherein during execution of the machine executable code by the processing circuitry, the method further comprises storing, by the processing circuitry, an identification of the one of the time intervals in:
a first data storage location that stores the tagging information for the corresponding instruction of the given type; and
a second data storage location that stores the information collected by the one or more hardware performance counters during the one of the time intervals.

12. The method as recited in claim 11, further comprising storing, in the first data storage location by the processing circuitry, an identification of a compute circuit of the processing circuitry that executed the corresponding instruction of the given type.

13. The method as recited in claim 8, wherein the instructions of the given type comprise one or more of shared memory access instructions or conditional control flow instructions.

14. The method as recited in claim 8, wherein the one or more padding instructions comprise instructions that do not modify program state information.

15. A non-transitory computer readable medium comprising program instructions executable by circuitry to:
access a first sequence of instructions of program instructions;
modify the first sequence of instructions to create a second sequence of instructions by adding one or more padding instructions; and
compile the second sequence of instructions into executable code for execution by processing circuitry,
wherein the one or more padding instructions are added based on a hardware performance counter update interval and cause executions of instructions of a given type to occur in different update intervals.

16. The non-transitory computer readable medium as recited in claim 15, wherein the instructions are executable to add one or more tagging instructions that identify corresponding instructions of the given type and correlate the corresponding instructions with information collected by the one or more hardware performance counters.

17. The non-transitory computer readable medium as recited in claim 16, wherein the tagging information identifies a location of the corresponding instruction of the given type in source code.

18. The non-transitory computer readable medium as recited in claim 16, wherein during execution of the machine executable code by the processing circuitry, the processing circuitry is configured to store an identification of the one of the time intervals in:

a first data storage location that stores the tagging information for the corresponding instruction of the given type; and a second data storage location that stores the information collected by the one or more hardware performance counters during the one of the time intervals.

19. The non-transitory computer readable medium as recited in claim 18, wherein the processing circuitry is configured to store, in the first data storage location, an identification of a compute circuit of the processing circuitry that executed the corresponding instruction of the given type.

20. The non-transitory computer readable medium as recited in claim 15, wherein the instructions of the given type comprise one or more of shared memory access instructions or conditional control flow instructions.

* * * * *